SHOCK-EXCITED CIRCUIT EMPLOYING TRANSISTORS

Filed July 10, 1956

INVENTOR.
Eric Wolfendale
BY Fred M. Vogel
AGENT 2,912,655

SHOCK-EXCITED CIRCUIT EMPLOYING TRANSISTORS

Eric Wolfendale, Horley, England, assignor, by mesne assignments, to North American Philips Company, Inc., New York, N.Y., a corporation of Delaware Application July 10, 1956, Serial No. 596,864

Claims priority, application Great Britain July 11, 1955

5 Claims. (Cl. 331—117)

This invention relates to transistor circuits for producing at least approximately sinusoidal oscillations of a frequency at least one order of magnitude higher than the α-cut-off frequency of the transistor.

A transistor circuit according to the invention is characterized in that the transistor is connected in a circuit arranged for producing steeply rising recurrent pulses, and in that a tank circuit tuned to the desired higher frequency is coupled to the collector-emitter circuit of the transistor, so as to be shock-excited by said pulses.

The invention will be described with reference to the appended drawing forming part of the specification and in which.

Figure 1:
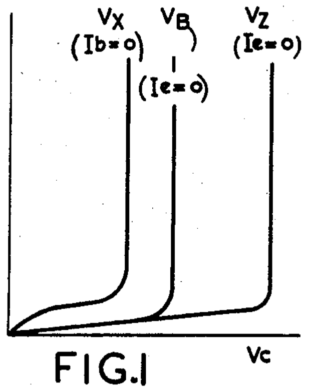
Fig. 1 is a graph showing the collector-current versus collector voltage characteristic of a transistor with various turn-over voltages.

In experimenting with junction transistors, it appears that they exhibit a number of different turn-over voltages at which the collector-current may increase rapidly. This behaviour is shown in the collector-current collector voltage ($Ic/Vc$) graph of Fig. 1 of the accompanying drawings, the turn-over voltage for each of the curves being the collector voltage at which the curve rises sharply.

Of these voltages, $V_Z$ is the well-known collector-base turn-over voltage at which the current between collector and base electrodes with disconnected emitter electrode increases rapidly. It has long been called "Zener-voltage," the turn-over being ascribed to the Zener effect.

The turn-over voltage $V_B$ is the so-called "avalanche voltage." Both $V_Z$ and $V_B$ correspond to zero emitter-current ($Ie=0$). The $V_B$ characteristic is due to the fact, that any electron or hole penetrating into the depletion layer between base and collector becomes accelerated by the electric field therein and may collide with a nucleus and produce a hole-electron pair, which are also accelerated and may produce further hole-electron pairs by collision. The result of this process is a charge-carrier multiplication by a factor $$M=\frac{1}{1-\left(\frac{Vc}{V_B}\right)^n}$$

wherein $Vc$ is the actual collector voltage and $n$ is a constant, which is for example approximately equal to 3 in the case of a pnp-junction transistor and at normal current densities.

In any given transistor, either $V_Z$ or $V_B$ has the lower value according to the resistivity $\rho$ of the base material.

Thus in practice only the turn-over voltage of the lower value exists, but the current multiplication by the factor M applies in any case.

A third turn-over voltage $V_x$, occurs with open-circuited base (base-current $Ib=0$), due to the fact that the emitter current is multiplied in the depletion layer by the factor M and therefore α increases with increasing collector voltage.

Figure 2:
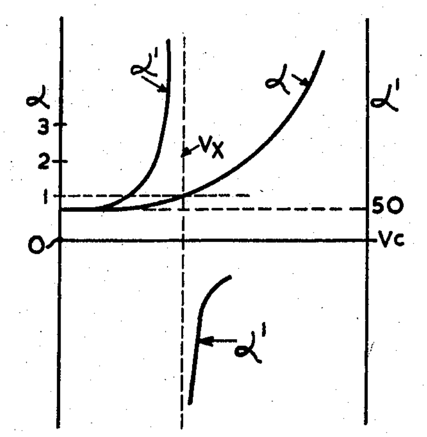
Fig. 2 is a graph showing the change in $\alpha'$ at various values of the collector voltage.

As α tends towards 1, so $$\alpha'=\frac{\alpha}{1-\alpha}$$

tends towards infinity, as illustrated by the graph of Fig. 2 of the accompanying drawings. Therefore, $I_c$ being known to be equal to $(\alpha'+1)I_{co}$ tends towards infinity together with $\alpha'$ and the turn-over voltage $V_x$ occurs where α reaches the value 1.

It has already been proposed to use a junction transistor in the region lying between the $V_x$ and $V_B$ or $V_Z$ characteristics where, owing to the charge-carrier multiplication in the depletion layer, it exhibits a current amplification α larger than one and in this respect its behaviour is comparable to that of a point-contact transistor. Under those circumstances, if one introduces an impedance of adequate magnitude between the base and emitter electrodes of a junction transistor and applies a reverse bias voltage equal to or larger than $V_B$ or $V_Z$ between its collector and its emitter-electrode via a load impedance, the base current produced by application of this voltage and flowing through the base-emitter impedance sets up there-across a forward bias voltage which eventually overcomes the initial reverse bias voltage, if any, so that an emitter current starts flowing. Due to the fact that the emitter-collector current amplification factor α is larger than one in the region considered and that the base-emitter impedance therefore has a regenerative action, this emitter-current increases until the collector-emitter voltage has dropped to the value of the turn-over voltage $V_x$ of the transistor, when α again becomes smaller than or equal to one.

In dynamical operation, it is possible to obtain larger voltage drops across the load due to charge-carrier storage in the transistor and operation in this mode may be obtained with the aid of a condenser connected between its collector and emitter electrodes. However, a large capacitor of say several 1000 pf. is required to ensure voltage drop to substantially zero collector-emitter voltage and this capacitor evidently limits the operating frequency, for instance the repetition frequency of pulses produced by means of the circuit.

Preferably, in the transistor circuit according to the invention, the transistor is a junction transistor and is operated in the region lying between the $V_x$ and $V_B$ or $V_Z$ characteristics, the circuit being then characterized in that the pulse producing circuit comprises biasing means for applying across the series-combination of a load impedance and of the collector to emitter and base paths of said transistor, a reverse voltage substantially in excess of the turn-over voltage of said transistor for zero base-current, so as to initiate a discharge current through the transistor, whereby the voltage across said paths collapses and recurrent pulses are produced.

Figure 3:
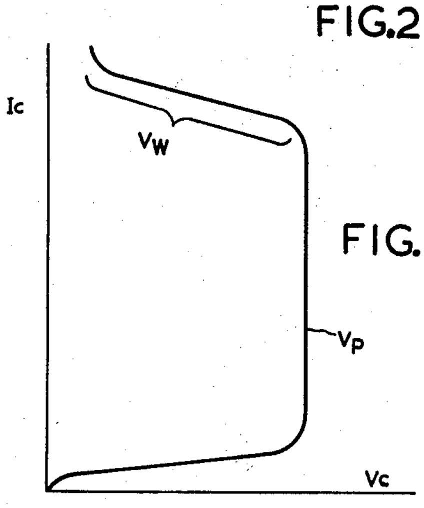
Fig. 3 is a graph showing the collector-current versus collector voltage characteristic of a transistor under conditions of another turn-over voltage different from those of Fig. 1.

A preferred embodiment of this type is based upon the fact, that when the base layer of the transistor is of relatively small thickness and/or conductivity, as is the case for example with high frequency transistors, a further turn-over can be observed at a voltage intermediate between $V_X$ and $V_B$ or $V_Z$ (according to which is lowest), when the emitter-base circuit of the transistor is closed and the field between the base and collector electrodes inhibits the sudden rise of the collector current at the third and lower most turn-over voltage $V_X$. No impedance and no reverse bias-voltage between the base and emitter electrode are necessary for ensuring occurrence of this new turn-over. It is supposed that the collector depletion layer extends through the base up to the emitter and that a so-called "punch-through" turn-over occurs. It has been discovered that, if this fourth turn-over voltage or "punch-through voltage" $V_P$ is materially higher than $V_X$, the multiplication factor M is materially larger than 1 and the collector current $Ic$ rises very suddenly up to a region of high current-densities and the turn-over characteristic $V_P$ shown on Fig. 3 of the accompanying drawings is continued by an heretofore unknown break-down characteristic $V_W$ along which the collector-emitter and base path of the transistor exhibits a considerable negative resistance. This static break-down characteristic extends down to a voltage value lower than that of the turn-over voltage $V_X$ with open base-circuit.

It has been found that the increase of the collector-current along the $V_P$ and $V_W$ characteristics is much faster than along any known turn-over characteristic, and that the field between the collector and base electrodes loses control over the collector current as soon as the voltage $V_P$ is reached and the collector current starts to rise steeply, the collector current and voltage of the transistor varying in a manner similar to the anode current and voltage of a gas discharge tube after it has fired.

Owing to the fact that the static $V_W$ characteristic extends down to low voltage values at high current densities and that, due to space charge or charge-carrier storage effects, the dynamical $V_W$ characteristic extends down even practically to zero voltage values, a transistor can be operated on said characteristic with less danger of being destroyed or damaged due to overloading or excess dissipation.

The $V_W$ break-down characteristic correspond to constant base-emitter bias voltage and it has been found that, if an impedance is included in the base-emitter circuit and exceeds a certain value, the rising current between collector and base electrodes may provide a forward bias overcoming the applied reverse bias voltage, if any, so that the break-down characteristic $V_W$ starts at a lower value of the collector current and/or extends further or more rapidly towards the low collector-emitter voltage condition. In this case, the breakdown occurs along a characteristic of increased negative resistance which intersects a family of $V_W$ curves starting all on the same $V_P$ curve but at different collector current values and corresponding each to a particular base-emitter bias voltage.

Accordingly, the said preferred embodiment of the type specified hereabove is characterized in that the emitter-circuit of the transistor comprises practically no D.C. resistance between the emitter-electrode and the circuit of the base-electrode of the transistor, in that said reverse voltage is lower than the turn-over voltage of said transistor with open emitter-circuit, and in that the base layer of said transistor is of such small thickness and/or conductivity that application of the said reverse voltage initiates through said collector-base and collector-emitter paths a current discharge which is sustained until the collector-emitter voltage has collapsed to a value substantially lower than its characteristic turn-over value for zero base-current, whereby recurrent pulses having a very steeply rising front edge are produced.

In particular embodiments, the biasing means comprise a source of D.C. voltage substantially in excess of the turn-over voltage for zero base-current, for example in excess of the $V_B$ or $V_Z$ turn-over voltage or, alternatively, in excess of the turn-over voltage $V_P$, so that the pulse producing circuit is free running.

Generally speaking, since the desired oscillations are produced in a tank circuit, sinusoidal or approximately sinusoidal oscillations may be obtained. Moreover, since the pulses produced in the transistor circuit are of a saw-tooth or like waveform rich in harmonics, the tank circuit may be tuned to a frequency which is a multiple of the pulse-recurrence frequency (P.R.F.). For example, the P.R.F. may be about 10 mc./s. with a "high-frequency" junction transistor, and the tank circuit may be tuned to the 8th of 9th harmonic so as to obtain a sine-wave of a frequency of about 80 or 90 mc./s.

Figure 4:
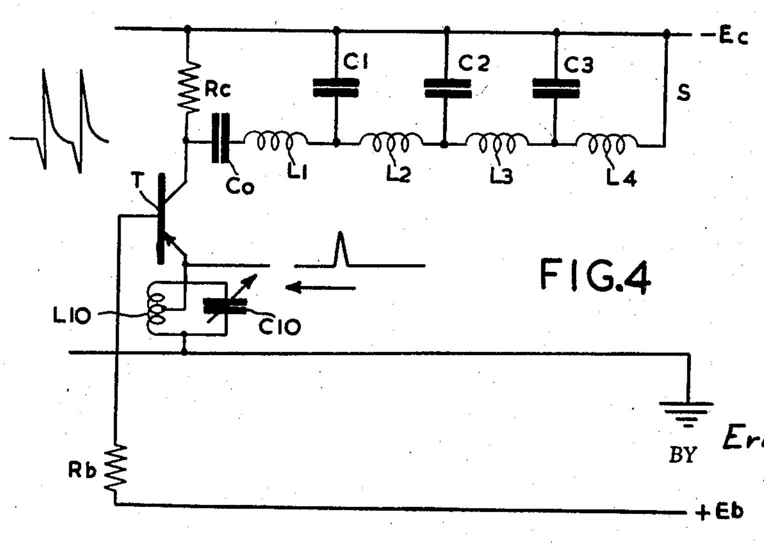
Fig. 4 is a schematic diagram of a circuit arrangement in accordance with the invention.

A preferred embodiment of the transistor circuit according to the invention is shown diagrammatically in Fig. 4.

The circuit of Fig. 4 comprises a pnp-junction transistor T, the collector electrode of which is connected to the negative terminal of a D.C. source of reverse bias voltage $Ec$ via a load resistor $Rc$. The emitter-electrode of this transistor is connected to a tapping of the inductance L10 of a tank-circuit L10, C10, one end of which is connected to earth and to the positive terminal of the source $Ec$. The emitter being connected to the tapping of L10, the portion of L10 between said tapping and earth provides an emitter-circuit having practically no D.C. resistance and a very low impedance between the emitter electrode and the circuit of the base-electrode of the transistor. Said last circuit comprises a resistance $Rb$ providing a regenerative action in the region wherein the transistor exhibits an emitter-collector current amplification factor $\alpha$ larger than one. It further comprises a source of reverse bias voltage $Eb$, the positive terminal of which is connected to the base electrode via the resistor $Rb$, while its negative terminal is earthed.

One end of a delay line L1 to L4 and C1 to C3 is connected across the load resistor $Rc$ via a blocking capacitor $Co$. The other end of said delay line is shorted at S in order to reflect and at the same time invert pulses derived from the collector-circuit of the transistor T. The tuned circuit L10, C10 is tuned to a harmonic of the P.R.F. of the approximately saw-tooth wave form appearing at the collector and shown alongside the latter.

In the operation of the circuit of Fig. 4, a starting pulse, as shown, is applied to the emitter electrode of the transistor T. Due to the characteristics of the circuit, described above, a recurrent signal is produced which has a somewhat saw-tooth waveshape having a fast-rising leading edge as is shown near the collector electrode. This signal is applied to the tuned circuit L10, C10, via the emitter electrode of the transistor T, and shock-excites the tuned circuit into a sinusoidal oscillation at its resonant frequency. The circuit L10, C10 can thus be tuned to oscillate at a frequency of a desired harmonic of the pulse signals, and this oscillation frequency can be higher than the $\alpha$ cut-off frequency of the transistor T.

A point contact transistor can evidently be made to operate satisfactorily in a similar circuit. However, it is preferred to employ a junction transistor.

The voltage of the D.C. source $Ec$ is substantially in excess of the turn-over voltage $V_x$ of the transistor for zero base-current and lower than its turn-over voltage $V_B$ or $V_Z$ for zero-emitter current, and the resistance $Rb$ is low enough to inhibit a sudden rise of current at the turn-over voltage $V_X$.

If the voltage of the source $Ec$ is lower than the turn-over voltage $V_P$, then oscillations may be initiated by a starting pulse superimposed on said voltage and applied, for example to the emitter, and a sinusoidal signal may be obtained from the same point or, for example, by inductive coupling to inductance L10.

In a modification of the circuit of Fig. 4, the short circuit S may be replaced by a terminating resistance, the junction therewith of L4 being capacitively coupled back to the emitter.

If the circuit is arranged to be free-running and the delay time of the delay line is arranged to be shorter than one sawtooth cycle, the delay line will be the frequency controlling element rather than the voltage $-E_c$, with consequent improvement in the constancy and control of both sawtooth and sine-wave frequencies.

What is claimed is:

1. A transistor circuit comprising a junction transistor having base, emitter and collector electrodes, a source of operating voltage, a load impedance, means connecting said load impedance and said source of operating voltage in a series circuit between said collector and emitter electrodes, a resonant circuit coupled to said emitter electrode, and means connected to bias said base electrode at a value to cause said transistor circuit to produce steeply rising recurrent pulses, whereby said resonant circuit is shock-excited by said pulses.

2. A circuit as claimed in claim 1, in which said resonant circuit is tuned to a harmonic frequency of the repetition frequency of said recurrent pulses.

3. A circuit as claimed in claim 2, in which said transistor has a cut-off frequency above which said transistor circuit cannot oscillate, said resonant circuit being tuned to a frequency which is higher than said cut-off frequency.

4. A circuit as claimed in claim 1, including a reflective delay line connected to said load impedance thereby to determine the repetition frequency of said repetitive pulses.

5. A circuit as claimed in claim 1, including a delay line one end of which is connected to said load impedance, and including means connected to couple the other end of said delay line to said emitter electrode.

References Cited in the file of this patent

UNITED STATES PATENTS

| | | |
|---|---|---|
| 2,462,061 | Beatty | Feb. 22, 1949 |
| 2,635,185 | Casey | Apr. 14, 1953 |
| 2,809,239 | Nielson | Oct. 8, 1957 |
| 2,812,436 | Overbeek | Nov. 5, 1957 |
| 2,817,761 | Holmann | Dec. 24, 1957 |